United States Patent
Yoon

(10) Patent No.: US 8,648,538 B2
(45) Date of Patent: *Feb. 11, 2014

(54) BIOLUX LIGHTING APPARATUS

(75) Inventor: Yoeng Cheol Yoon, Seoul (KR)

(73) Assignee: IDSYS Co., Ltd., Seoul (KR)

( * ) Notice: Subject to any disclaimer, the term of this patent is extended or adjusted under 35 U.S.C. 154(b) by 221 days.

This patent is subject to a terminal disclaimer.

(21) Appl. No.: 13/266,643

(22) PCT Filed: Apr. 26, 2010

(86) PCT No.: PCT/KR2010/002591
§ 371 (c)(1),
(2), (4) Date: Oct. 27, 2011

(87) PCT Pub. No.: WO2010/128766
PCT Pub. Date: Nov. 11, 2010

(65) Prior Publication Data
US 2012/0049746 A1 Mar. 1, 2012

(30) Foreign Application Priority Data
May 8, 2009 (KR) .......... 10-2009-0040028

(51) Int. Cl.
H05B 37/02 (2006.01)
H05B 39/04 (2006.01)

(52) U.S. Cl.
USPC .......................... 315/158; 315/159

(58) Field of Classification Search
USPC .................. 315/156–159, 149, 150, 246, 224
See application file for complete search history.

(56) References Cited

U.S. PATENT DOCUMENTS

| | | | | |
|---|---|---|---|---|
| 5,406,173 A * | 4/1995 | Mix et al. | ....... | 315/156 |
| 7,339,471 B1 * | 3/2008 | Chan et al. | ....... | 340/541 |
| 2006/0071605 A1 * | 4/2006 | Diederiks | ....... | 315/76 |
| 2007/0153524 A1 * | 7/2007 | Lee | ....... | 362/276 |
| 2009/0033504 A1 * | 2/2009 | Tsai et al. | ....... | 340/584 |

FOREIGN PATENT DOCUMENTS

| | | |
|---|---|---|
| JP | 06-176875 A | 6/1994 |
| JP | 10-302969 A | 11/1998 |
| JP | 2003-334250 A | 11/2003 |
| KR | 20-0417201 Y1 | 5/2006 |

OTHER PUBLICATIONS

English Language Abstract of JP 06-176875 A.
English Language Abstract of JP 10-302969 A.
English Language Abstract of JP 2003-334250 A.
International Search Report of PCT/KR2010/002591 mailed on Nov. 30, 2010.

* cited by examiner

*Primary Examiner* — Minh D A
(74) *Attorney, Agent, or Firm* — Rabin & Berdo, P.C.

(57) ABSTRACT

A biolux lighting apparatus comprising a timer for counting a dark adaptation time, a sensor for sensing the motion of an object, a lamp having an adjustable brightness, and a control unit in which a dark adaptation threshold value is set and which controls each unit. The control unit controls the lamp to emit light at a set maximum brightness level when an object sensed signal is transmitted by the sensor, controls the timer to start counting when the light from the lamp has reached the maximum brightness level such that the brightness level of the lamp is lowered by the intensity of illumination within the set dark adaptation threshold value whenever a counting signal is generated by the timer. The control unit controls the timer to stop counting to maintain a set standard brightness level when the light from the lamp has reached the set standard brightness level.

7 Claims, 2 Drawing Sheets

BIOLUX LIGHTING APPARATUS

TECHNICAL FIELD

The present invention relates, in general, to a biolux lighting apparatus for use in the office, a passageway, a stairway, or the entrance, and more particularly to, a biolux lighting apparatus which can prevent persons from recognizing changes in the intensity of illumination, and greatly save energy.

BACKGROUND ART

Currently available lighting apparatuses are actuated in such a manner as to be turned on and off when a motion of an object is detected or not detected by a sensor. However, since such a conventional lighting apparatus is turned off exactly when a person who was detected move out of the detection range, he/she may feel fatigue or uneasy. Particularly, if the office is equipped with a sensor-actuated lighting apparatus in which lamps are actuated by spatial sections in the office by means of a sensor, some lamps provided in a specific space where a person is becoming more distant are turned off, becoming dark, whereas some lamps in a specific space where a person stays remain on, so that the person staying may become jittery and is distracted by a variation in illuminance.

In addition, when a person works at an office, a detecting sensor detects the person to allow for turned-on state. Here, if the person remains in the office for a long time, keeping on a turned-on state naturally increases the energy consumption.

In addition, in the sensor-actuated lighting apparatus that is currently available, lamps are turned on or off according to the detection of an object by a detecting sensor, so that when the sensor does not detect an object, the lamps are turned off and the space is in the dark state. In this state, if a person enters the space, he/she may feel uneasy. Further, if such space is a place such as a parking lot or stairs, the person may be in danger of meeting with an accident.

Moreover, since when a person who is moving in a specific area becomes out of detection range after having been detected, the lighting apparatus is directly turned off, the person who does not yet move out of the area may feel uneasy because the lighting apparatus is turned off.

DISCLOSURE

Technical Problem

Accordingly, the present invention has been made keeping in mind the above problems occurring in the related art, and an objective of the present invention is to provide a biolux lighting apparatus which can prevent persons from recognizing changes in the intensity of illumination, and greatly save energy.

Further, another object of the present invention is to provide a biolux lighting apparatus in which even if a person is not detected, lighting from a lamp is maintained at a certain brightness level.

Technical Solution

In order to achieve the above objects, according to one aspect of the present invention, there is provided a biolux lighting apparatus including: a timer for counting a dark adaptation time; a sensor for sensing the motion of an object (e.g. a person); a lamp having an adjustable brightness; and a control unit in which a dark adaptation threshold value is set, and which controls the timer, the sensor, and the lamp, wherein the control unit controls the lamp to emit light at a set maximum brightness level when an object sensed signal is received from the sensor, controls the timer to start counting when the brightness level of the lamp has reached the maximum brightness level such that the brightness level of the lamp is lowered by the intensity of illumination within the set dark adaptation threshold value whenever a counting signal is generated by the timer, and controls the timer to stop counting to maintain a set standard brightness level when the brightness level of the lamp has reached the set standard brightness level.

In the biolux lighting apparatus, if the object sensed signal is not received from the sensor, the control unit is configured to control the timer to re-start counting such that the brightness level of the lamp is continuously lowered by the intensity of illumination within the set dark adaptation threshold value whenever a counting signal is generated by the timer, and control the timer to stop counting to maintain a set minimum brightness level when the brightness level of the lamp has reached the set minimum brightness level from the set standard brightness level.

In the biolux lighting apparatus, a light adaptation time and a light adaptation threshold value are respectively additionally set in the timer and control unit, so that when the object sensed signal is received from the sensor, the control unit controls the timer to start counting such that the brightness level of the lamp is increased by the intensity of illumination within the set light adaptation threshold value to the set maximum brightness level whenever a counting signal is generated by the timer.

In the biolux lighting apparatus, the dark adaptation time, light adaptation time, dark adaptation threshold value, and light adaptation threshold value are set to a variety of values depending upon the intensity of illumination.

In the biolux lighting apparatus, the dark adaptation threshold value taken from the maximum brightness level to the standard brightness level is set greater than the dark adaptation threshold value taken from the standard brightness level to the minimum brightness level.

In the biolux lighting apparatus, the dark adaptation time taken from the maximum brightness level to the standard brightness level is set shorter than the dark adaptation time taken from the standard brightness level to the minimum brightness level.

Advantageous Effects

According to the present invention, the biolux lighting apparatus provides effects that when a person stays in a specific space, the brightness level of the lamp is lowered to the set standard brightness level, thereby greatly saving energy consumption while preventing the person from recognizing changes in the intensity of illumination.

In addition, the biolux lighting apparatus provides effects that when the intensity of illumination is adjusted, a person illuminated by a lamp is prevented from not only recognizing changes in the intensity of illumination but also feeling uneasy even when the intensity of illumination of a lamp of an adjacent biolux lighting apparatus varies.

Further, in the biolux lighting apparatus, it is allowed that the intensity of illumination thereof is maintained at a minimum brightness level, thereby providing an effect of preventing a person from feeling uneasy when he moving around a certain area.

<Major Reference Numerals of the Drawings>

| | |
|---|---|
| 301: Timer | 302: Motion Sensor |
| 303: Lamp with an adjustable brightness level | 304: Control Unit |

BEST MODE

Figure 1:
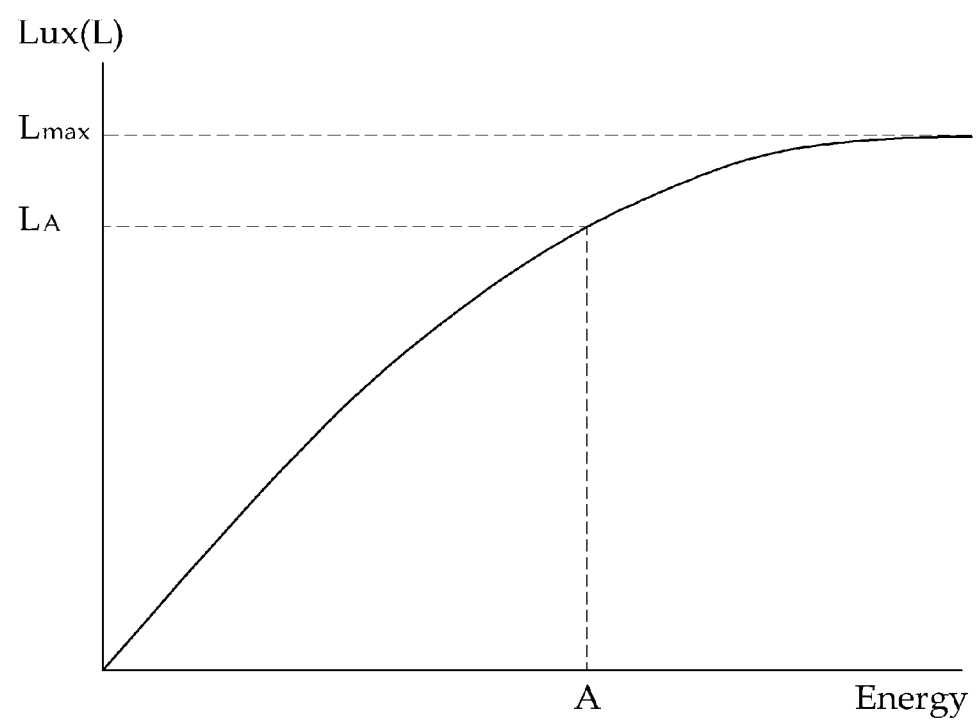
FIG. 1 is a graphical diagram showing the correlation between illumination and energy.

FIG. 1 is a graphical diagram showing the correlation between illumination and energy. As shown in FIG. 1, it can be known that as the energy consumption rapidly increases, illumination accordingly increases rapidly, but above a certain level of illumination ($L_A$), the illumination increases softly in response to an increase in the energy consumption.

That is, while the energy consumption becomes high above the certain level of illumination, the illumination does not greatly increases as much as the energy consumption increases, above the certain level of illumination.

Figure 2:
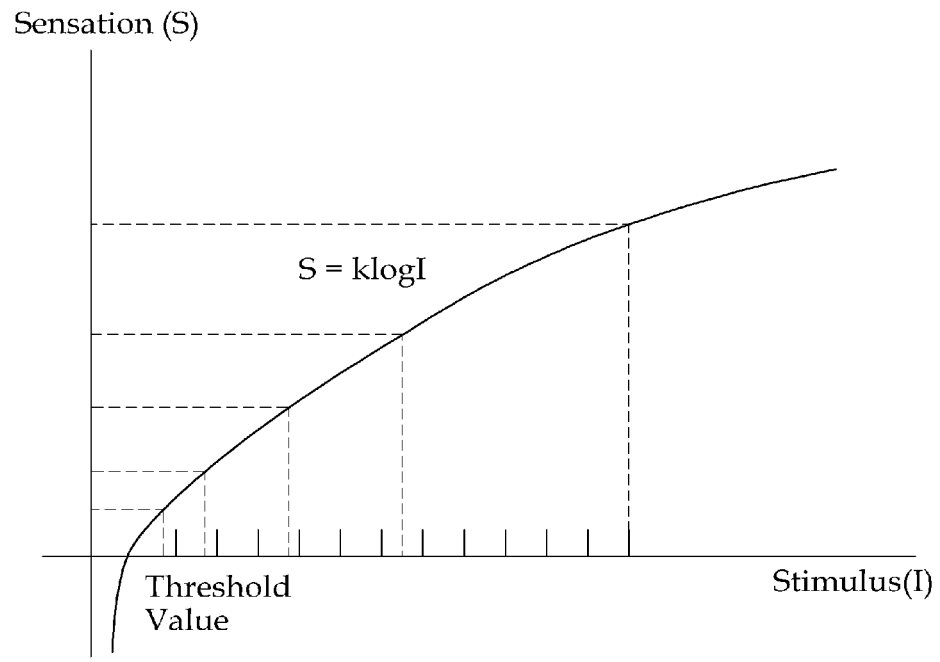
FIG. 2 is a graphical diagram showing the correlation between sense and stimulus.

FIG. 2 is a graphical diagram showing the correlation between sense and stimulus. As shown in FIG. 2, a human body continuously reacts to external stimulus. Here, there are separate sense organs that sense external stimulus according to the kinds of external stimulus influencing the human body. However, sense organs cannot infinitely sense a whole level of stimulus, but can sense a minimum level of stimulus that influences the human body. Here, the minimum level of stimulus is called a threshold value in a biological term. Briefly, if a certain level of stimulus within a threshold value is influenced upon a human body, the sense organs of the human body cannot recognize such a stimulus at all.

The sense that the present invention intends to use in regard to illumination is the visual sensation. Since the visual sensation is also the sense, a sense organ that senses the visual sensation is eyes. If changes occur in the intensity of illumination, the sense organ reacts to the changed intensity of illumination in order to be adapted thereto. If the illumination is lowered, the iris of the eye increases the size of the pupil, and the sensibility of retinal visual cells is adjusted. That is, a threshold value of the visual cells is controlled. Sensitivity of the visual cell is controlled by a material called rhodopsin, which is decomposed by light to generate energy, which enables a person to feel the sense of sight.

If the intensity of illumination is lowered, rhodopsin is concurrently synthesized and accumulated in rod cells of the visual cells, which makes a person adapted to the dark. A phenomenon that eyes are adapted to the dark is called dark adaptation, whereas a phenomenon that eyes are adapted to the light is called light adaptation. Although visual cells have perceived changes in the illumination as the illumination appropriately changes, if such a mechanism is performed within a short time in order to allow the visual sensation to be adapted to changed illumination, the human body can be adapted to changes in the intensity of illumination without his practical perception (e.g. feeling uneasy) with regard to the sensitivity of cells.

According to the Weber-Fechner law that is related to a study for the response of perception to stimulus, the magnitude of perception is logarithmically proportional to a physical stimulus that stimulates the sensation. That is, as the intensity of stimulus increases, the sensation is weakened. The quantity of stimulus to which the human body starts responding is proportional to an initial stimulus, and the magnitude of the response decreases as the intensity of stimulus increases. That is, high intensity of illumination causes a high threshold value, low intensity of illumination causes a low threshold value, low intensity of illumination requires much adaptation time, and high intensity of illumination requires less adaptation time. According to this principle, it can be expected that since the magnitude of response may be small in the light state, a great deal of the intensity of illumination may be changed, and vice versa in the dark state.

Figure 3:
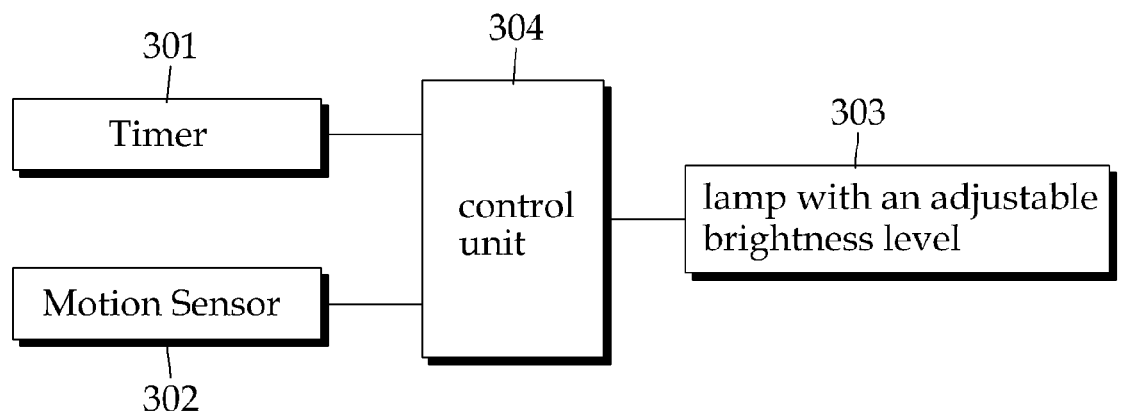
FIG. 3 is a view showing the construction of a biolux lighting apparatus according to an embodiment of the present invention.

FIG. 3 is a view showing the construction of the biolux lighting apparatus according to an embodiment of the present invention. As shown in FIG. 3, the biolux lighting apparatus includes a timer 301 which counts a dark adaptation time, a sensor 302 which detects an object, a brightness-adjustable lamp 303, and a control unit 304 which controls the operation of the timer, the sensor, and the lamp.

The timer 301 counts a set dark adaptation time. The dark adaptation time varies depending upon the intensity of illumination, so that the dark adaptation time is set according to the intensity of illumination. The biolux lighting apparatus sets a maximum brightness level, a standard brightness level, and a minimum brightness level. The standard brightness level is determined in consideration of the relationship between energy and illumination, in which as shown in FIG. 1, the increase in the intensity of illumination slows down even when the energy increases. The standard brightness level is determined to have a brightness level that is not greatly different from the maximum brightness level in consideration of the energy consumption. Accordingly, the dark adaptation time taken from the maximum brightness level to the standard brightness level is set to a value that is greatly smaller than the dark adaptation time taken from the standard brightness level to the minimum brightness level. This is because when the intensity of illumination is high, the adaptation time is short.

The sensor 302 detects an object and transmits a detection signal to the control unit. The sensor may be a motion sensor to detect the motion of an object, or otherwise it may be a sensor that can detect an object irrespective of the motion of the object.

The lamp 303 is brightness-adjustable, and the brightness level thereof is regulated under the control of the control unit. The lamp may preferably be a brightness-adjustable LED. Alternatively, the lamp may comprise a plurality of conventional lamps such as incandescent lamps, fluorescent lamps, halogen lamps, or the like, which is brightness-adjustable with a switching method.

The control unit 304 sets a dark adaptation threshold value, serves to control the lamp to emit light at a set maximum brightness level when a detection signal is received from the sensor, control the timer to start counting when the brightness level of the lamp has reached the maximum brightness level such that the brightness level of the lamp is lowered by the intensity of illumination within the set dark adaptation threshold value whenever a counting signal is generated by the timer. The control unit controls the timer to stop counting to maintain a set standard brightness level when the brightness level of the lamp has reached the set standard brightness level.

In case where a person moves away so that the sensor cannot detect the presence of an object, the control unit controls the timer to re-start counting such that the brightness level of the lamp is continuously lowered by the intensity of illumination within the set dark adaptation threshold value whenever a counting signal is generated by the timer, and control the timer to stop counting to maintain a set minimum brightness level when the brightness level of the lamp has reached the set minimum brightness level from the set standard brightness level.

Here, the intensity of illumination within the threshold value means a value enough that a person cannot feel changes in the intensity of illumination, so that a threshold value taken from the maximum brightness level to the standard brightness level is set greater than a threshold value taken from the standard brightness level to the minimum brightness level.

This is because the magnitude of response becomes smaller as the brightness level increases further in the light state, so that even if a great deal of the intensity of illumination is changed, a person cannot feel it.

Since the intensity of illumination in the process of reaching the minimum brightness level from the standard brightness level is lower than that in the process of reaching the standard brightness level from the maximum brightness level, the threshold value thereof is set to a small value.

In addition, the dark adaptation threshold value and the dark adaptation time is set to suit to a set value of the maximum brightness level, the standard brightness level, and the minimum brightness level.

According to this control method, if a person stays in a certain space, the intensity of illumination is lowered to a level enough that a person cannot feel changes in the intensity of illumination in order to save energy, and the intensity of illumination is then controlled to have a standard brightness level that has the highest energy efficiency, thereby obtaining high energy efficiency while allowing a person not to feel changes in the intensity of illumination.

In addition, if a person moves away so that the sensor cannot detect the presence of an object, the brightness level of the lamp is continuously lowered to the intensity of illumination within the dark adaptation threshold value such that the intensity of illumination reaches the minimum brightness level. Thus, when a plurality of biolux lighting apparatuses are disposed in a wide space such as the office, even if a person who has been in a neighboring region is moving away, the brightness level of a lamp of a biolux lighting apparatus disposed in the corresponding region is slowly lowered, so that a person who is in a region adjacent to the neighboring region can do his work while not feeling uneasy even when the brightness level of the biolux lighting apparatus around himself instantly varies.

In addition, even if no person stays in a certain space, the minimum brightness level is maintained, so that when a person enters the space, he may not feel uneasy due to darkness.

In the meantime, in case where a person enters a certain space, a dark adaptation time is additionally set to the timer, and a dark adaptation threshold value is additionally set to the control unit, so that when a detection signal is received from sensor, the control unit can control the timer to perform a counting operation such that whenever a counting signal is generated by the timer, the brightness level of the lamp is increased by the intensity of illumination within the dark adaptation threshold value so that the brightness level reaches the set maximum brightness level.

Since the minimum brightness level is basically maintained, even when a person enters a certain space, the brightness level of the lamp is increased not quickly but slowly. Thus, when a plurality of biolux lighting apparatuses are disposed in a wide space such as the office, even if a person enters a certain space, the brightness level of a lamp of a biolux lighting apparatus disposed in the corresponding region is slowly increased, so that a person who has stayed adjacent the certain space can do his work while not feeling uneasy even when the brightness level of the lamp around himself instantly varies. In addition, the person who enters the space may also feel easier because the brightness level of the lamp of the biolux lighting apparatus disposed in that space varies not instantly but slowly so that he can be adapted to the light state.

What is claimed is:

1. A biolux lighting apparatus comprising:
   a timer counting a preset time and outputting a counting signal when the timer counts the preset time;
   a motion sensor sensing a motion of an object;
   a lamp with an adjustable brightness level; and
   a control unit controlling the timer, the motion sensor, and the lamp, the control unit
      controlling the lamp to emit light at a set maximum brightness level when the control unit receives an object sensed signal from the motion sensor that an object moves into a predetermined range,
      controlling the timer to repeatedly count a first dark adaption time when the brightness level of the lamp reaches the set maximum brightness level,
      controlling the brightness level of the lamp to be lowered by an intensity of illumination within a first dark adaptation threshold value at each time the control unit receives a first counting signal generated by the timer after counting the first dark adaption time,
      controlling the timer to stop counting when the brightness level of the lamp reaches a set standard brightness level, and
      controlling the lamp to maintain the set standard brightness level.

2. The biolux lighting apparatus according to claim 1, wherein if the control unit receives an object sensed signal from the motion sensor that the object moves out from the predetermined range, the control unit
   controls the timer to repeatedly count a second dark adaption time,
   controls the brightness level of the lamp to be lowered by an intensity of illumination within a second dark adaptation threshold value at each time the control unit receives a second counting signal generated by the timer after counting the second dark adaption time,
   controls the timer to stop counting when the brightness level of the lamp reaches a set minimum brightness level from the set standard brightness level, and
   controls the lamp to maintain the set minimum brightness level.

3. The biolux lighting apparatus according to claim 2, wherein the dark adaptation times and the dark adaptation threshold values are set to a variety of values depending upon the brightness level of the maximum brightness level, the standard brightness level, and the minimum brightness level.

4. The biolux lighting apparatus according to claim 2, wherein, the control unit
   controls the timer to repeatedly count a light adaption time when the control unit receives the object sensed signal from the motion sensor that the object moves into the predetermined range, and
   controls the brightness level of the lamp to be increased by an intensity of illumination within a light adaptation threshold value at each time the control unit receives a third counting signal generated by the timer after counting the light adaption time.

5. The biolux lighting apparatus according to claim 2, wherein the first dark adaptation threshold value is greater than the second dark adaptation threshold value.

6. The biolux lighting apparatus according to claim 2, wherein the first dark adaptation time is shorter than the second dark adaptation time.

7. The biolux lighting apparatus according to claim 1, wherein the control unit
- controls the timer to repeatedly count a light adaption time when the control unit receives the object sensed signal from the motion sensor that the object moves into the predetermined range, and
- controls the brightness level of the lamp to be increased by an intensity of illumination within a light adaptation threshold value at each time the control unit receives a third counting signal generated by the timer after counting the light adaption time.

* * * * *